United States Patent [19]

Rodgers

[11] Patent Number: 4,773,456
[45] Date of Patent: Sep. 27, 1988

[54] MOTOR VEHICLE FLOOD PROTECTION APPARATUS

[76] Inventor: James K. Rodgers, 9801 E. 17th St., Indianapolis, Ind. 46229

[21] Appl. No.: 635,078

[22] Filed: Jul. 27, 1984

[51] Int. Cl.⁴ .......................................... B65D 81/18
[52] U.S. Cl. ................................. 150/52 K; 206/335; 206/524.8; 296/136
[58] Field of Search ............ 150/52 K; 383/100, 103; 206/524.8, 335, 522; 220/203, 372; 137/527, 527.6; 441/41, 90, 117, 118; 296/100, 136

[56] References Cited

U.S. PATENT DOCUMENTS

| | | | |
|---|---|---|---|
| 1,999,171 | 4/1935 | Bryant | 150/52 K |
| 2,193,116 | 3/1940 | Smith | 220/372 |
| 2,366,600 | 1/1945 | Daniel | 150/52 K |
| 3,515,305 | 8/1968 | Weber et al. | 220/372 |
| 3,653,497 | 4/1972 | Hornstein | 206/335 |
| 4,103,810 | 8/1978 | Hickey | 206/522 |
| 4,315,535 | 2/1982 | Battle | 150/52 K |
| 4,397,636 | 8/1983 | Ganshaw | 441/117 |
| 4,433,702 | 2/1984 | Baker | 137/527.6 |
| 4,465,188 | 8/1984 | Soroka et al. | 206/522 |
| 4,471,812 | 9/1984 | Bertsch | 137/527.6 |

FOREIGN PATENT DOCUMENTS

| | | | |
|---|---|---|---|
| 625882 | 1/1963 | Belgium | 296/136 |
| 1300151 | 5/1961 | France | 137/527.6 |
| 683933 | 9/1979 | U.S.S.R. | 296/136 |

Primary Examiner—David T. Fidei
Attorney, Agent, or Firm—John H. Calhoun, Jr.

[57] ABSTRACT

A motor vehicle flood protection apparatus comprising a flexible cover of water impervious material that is adapted to be folded over a motor vehicle and sealed to form a water impervious container around the motor vehicle and a flexible vent tube that opens at one end into the said container and that is provided with a flotation collar at the other end for buoying up the other end to the surface of flood waters. A spring loaded baffle vents air within the container to the atmosphere while at the same time preventing water, mud and debris from entering the vent tube and the container.

2 Claims, 1 Drawing Sheet

MOTOR VEHICLE FLOOD PROTECTION APPARATUS

BACKGROUND OF THE INVENTION

The present invention relates to flood protection devices for motor vehicles and more particularly to flexible covers that can be folded over motor vehicles and sealed against the entrance of water, mud and debris. The apparatus of the present invention includes a floatable and baffled vent tube that opens into the cover for venting air within a protective cover while at the same time preventing the entrance of water, mud and debris. Bumpers are also provided to protect fixtures attached to motor vehicles, such as rear view mirrors and hood ornaments, against damage from floating objects being driven along by flood waters.

Flood waters and the mud and debris carried along therewith often do extensive damage not only to the exteriors of motor vehicles but also to passenger compartments, trunks, engines, transmissions, bearings, steering mechanisms and other operating parts. While some floods occur suddenly and unexpectedly, flood conditions are often forseen and flood warnings are often given. It is therefore desirable in flood prone areas to have a reliable and quickly deployable protective apparatus for use with motor vehicles when flooding is expected.

Flood protection devices are known in the prior, as shown by U.S. Pat. No. 3,884,523 issued on May 20, 1975 to Brian S. Allen, which shows a compact and quickly deployable cover for a motorcycle or motorbike.

U.S. Pat. No. 4,315,535 issued on Feb. 16, 1982 to Daniel S. Battle shows a flood protection apparatus comprising a unitary flexible container having an orifice at the top for receiving a motor vehicle therein and a draw string for constricting the orifice after the vehicle is placed in the container.

SUMMARY OF THE INVENTION

The flood protection apparatus of the present invention has all the advantages of devices known in the art for protecting motor vehicles against flood waters, and in addition it provides several distinct and important advantages not provided by existing devices.

One object of the present invention is to provide a flood protection device that is light in weight, compact, and may be easily and conveniently stored in a motor vehicle the large percentage of time when the apparatus is not in use. Another object of the present invention is to provide a device that may be quickly and easily deployed when flood conditions exist and flooding is likely to occur. Another object of the present invention is to provide a flexible cover that will collapse upon a motor vehicle as flood waters rise. Another object of the present invention is to provide a device that will prevent the entrance of flood waters, mud and debris even when flood waters completely submerge a motor vehicle within the device. Another object of the present invention is to provide protection against mechanical damage for fixtures like rear view mirrors and hood ornaments. Another object of the present invention is to provide an apparatus that will vent air from within the apparatus while at the same time preventing flood waters from entering the apparatus. Another object of the present invention is to provide an apparatus that will not easily become snagged on objects or debris outside the apparatus. Another object of the present invention is to provide an apparatus that is simple in construction, inexpensive, easy to understand and operate, and well adapted for the purposes for which it is designed. Other objects and advantages of the present invention will become apparent from a consideration of the following detailed description taken in connection with the accompanying drawings wherein a preferred embodiment of the invention is shown. It should be understood that the invention is not limited to the details disclosed, but includes all such variations and modifications as fall within the spirit of the invention and the scope of the appended claims.

The objectives of the present invention are accomplished by providing a flexible cover that is made from water impervious material that is adapted to be folded over a motor vehicle and sealed to form an air tight and water tight container around the motor vehicle. A lightweight and flexible vent tube opens at one end into the container and is provided at the other end with an external flotation collar adapted to float the vent end of the tube on the surface of flood waters, an internal spring loaded baffle adapted to vent air within the cover to the atmosphere while at the same time preventing water, mud and debris from entering the tube and cover, and a mesh cover to prevent debris from interfering with the operation of the baffle. A plurality of bumpers is provided for covering and protecting fixtures like rear view mirrors and hood ornaments from mechanical damage when objects and debris carried by flood waters collide with the said fixtures.

BRIEF DESCRIPTION OF THE DRAWINGS

A preferred embodiment of the present invention is illustrated in the accompanying drawings in which.

DESCRIPTION OF THE PREFERRED EMBODIMENT

Figure 1:
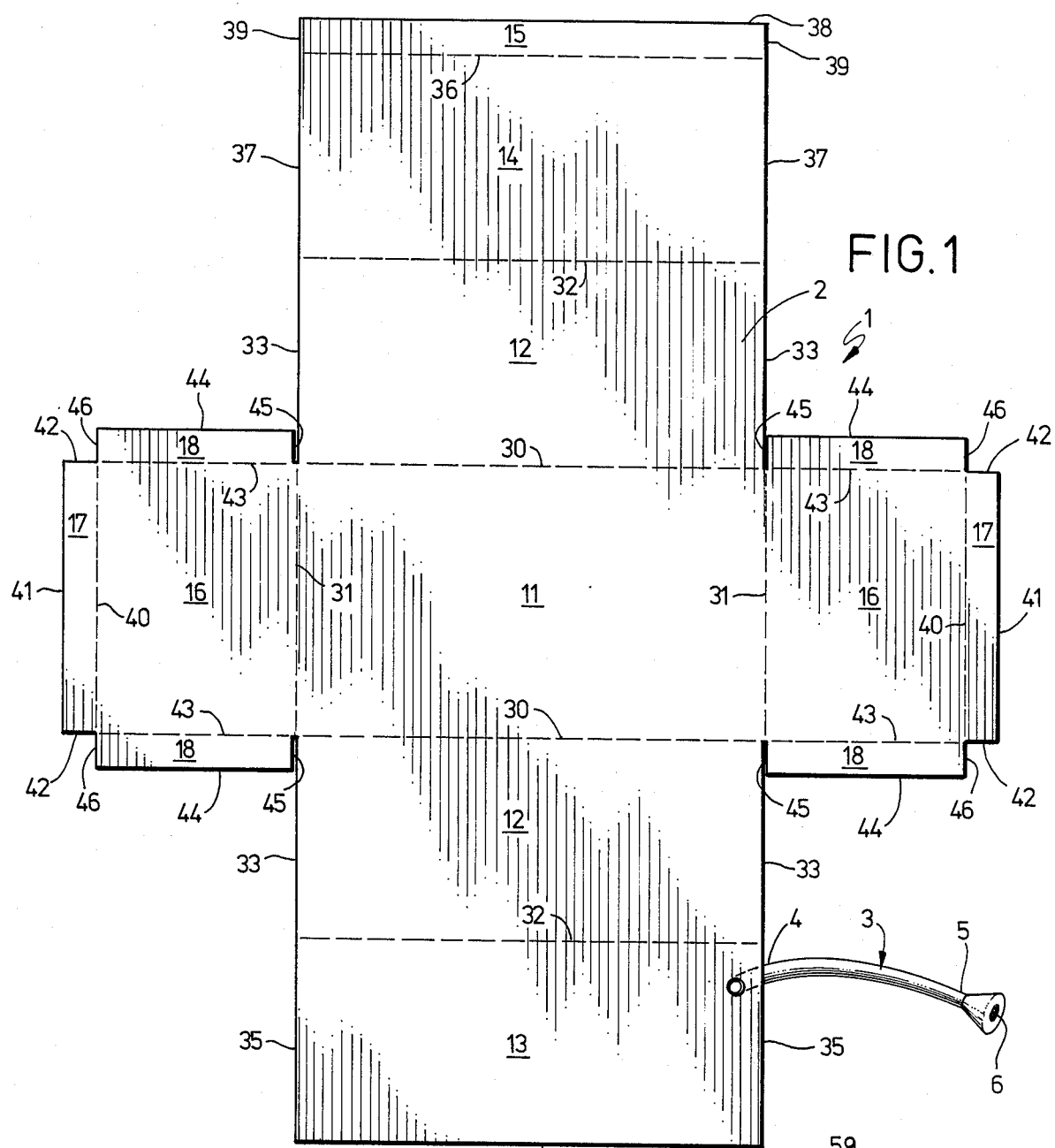
FIG. 1 is top view of an open cover and of a vent tube of the present invention.

Referring now to the drawings in greater detail, FIG. 1 illustrates the automobile flood protection apparatus of the present invention, shown generally at 1. The apparatus 1 comprises a protective flood cover 2 for a motor vehicle comprising a flexible sheet of water impervious material such, for example, as polyethylene, that is adapted to be folded over a motor vehicle and sealed to form the protective flood cover 2 and a flexible vent tube 3 having a first end 4 that is molded or otherwise suitably joined to the cover 2 and having a second end 5 that is adapted to float on the surface of flood waters and that is provided with a sealable opening 6 that is adapted to vent air within the cover 2 to the atmosphere and is adapted to prevent flood waters from entering the cover 2.

The cover 2 is divided by folding lines or creases into a plurality of regions 11–18. A bottom region 11 is bounded by a pair of parallel bottom side-fold lines 30 and a pair of parallel bottom end-fold lines 31. The bottom side-fold lines 30 are spaced apart relative to each other not closer than the width of a motor vehicle. The bottom end-fold lines 31 are perpendicular to the bottom side-fold lines 30 and are spaced apart relative to each other not closer than the length of a motor vehicle.

Extending outward from each bottom side-fold line 30 is a side region 12 bounded by a bottom side-fold line 30, a top side-fold line 32, and a pair of end edges 33. The top side-fold line 32 and bottom side-fold line 30 are parallel with each other and are spaced apart relative to each other not closer than the height of a motor vehicle. The end edges 33 are perpendicular to the bottom side-fold lines 30 and top side-fold line 32 and are spaced apart relative to each other not closer than the length of a motor vehicle.

Extending outward from one top side-fold line 32 is a first top region 13 and extending outward from the second top side-fold line 32 is a second top region 14. The first top region 13 is bounded by a top side-fold line 32, a top edge 34, and a pair of end edges 35. The top side-fold line 32 and top edge 34 are parallel with each other and are spaced apart relative to each. The end edges 35 are extensions of end edges 33 of an adjoining side region 12; are perpendicular to the top side-fold lines 32 and top edge 34; and are spaced apart relative to each other not closer than the length of a motor vehicle.

The second top region 14 is bounded by a top side-fold line 32, a top overlap line 36, and a pair of end edges 37. The top side-fold line 32 and top overlap line 36 are parallel with each other and are spaced apart relative to each other not closer than the width of a motor vehicle less the distance between the top side-fold line 32 and top edge 34 of the first top region 13. The end edges 37 are extensions of end edges 33 of an adjoining side region 12; are perpendicular to the top side-fold lines 32 and top overlap line 36; and are spaced apart relative to each other not closer than the length of a motor vehicle.

Extending outward from the second top region 14 is a top overlap region 15 bounded by the top overlap line 36, a top edge 38, and a pair of end edges 39. The top overlap line 36 and top edge 38 are parallel with each other and are spaced apart relative to each other not closer than an amount reasonably required to form an overlap for sealing the top of the cover 2. The end edges 39 are perpendicular to the top overlap line 36 and top edge 38 and are spaced apart relative to each other not closer than the length of a motor vehicle.

Extending outward from each bottom end-fold line 31 is an end region 16. Each end region 16 is bounded by a bottom end-fold line 31, an end top-fold line 40, and a pair of end side-fold lines 43. The bottom end-fold line 31 and end top-fold line 40 are parallel with each other and are spaced apart relative to each other not closer than the height of a motor vehicle. The end side-fold lines 43 are extensions of bottom side-fold lines 30; are perpendicular to the bottom end-fold lines 31 and end top-fold lines 40; and are spaced apart relative to each other not closer than the width of a motor vehicle.

Extending outward from each end region 16 is a first end overlap region 17 bounded by an end top-fold line 40, an end top-edge 41 and a pair of side-edges 42. The end top-fold line 40 and an end top-edge 41 are parallel with each other and are spaced apart relative to each other not closer than an amount reasonably required to produce an overlap seal of the end region 16 to the top regions 13, 14. The side-edges 42 of each end overlap region 17 are perpendicular to the end top-fold line 40 and end top-edge 41 thereof and are spaced apart relative to each other not closer than the width of a motor vehicle.

Also extending outward from each end region 16 and on opposite sides thereof is a pair of side over lap regions 18. Each side overlap region 18 is bounded by an end side-fold line 43, an end side-edge 44, a bottom-edge 45 and a top-edge 46. The end side-fold lines 43 and end side-edges 44 are parallel with each other and are spaced apart relative to each other not closer than an amount reasonably required to produce an overlap seal of the end region 16 to the side regions 12. The bottom edge 45 and top edge 46 of each side overlap region 18 are perpendicular to the end side-fold lines 43 and end side-edges 44 thereof and are spaced apart relative to each other not closer than the height of a motor vehicle.

The bottom region 11, side regions 12, top regions 13, 14, and end regions 16 are adapted to fit over and cover a motor vehicle, and the top overlap regions 15, 17 and side overlap regions 18 are adapted by the application of adhesives or by other suitable means to seal the cover 2 against the entrance of water, mud or debris when the cover 2 is folded over a motor vehicle and sealed.

As can now be seen, the cover 2 of the present invention comprises a flexible sheet of water impervious material adapted to be folded over a motor vehicle and adapted to be sealed to prevent the entrance of water, mud or debris into the cover. In the illustrated embodiment, and for convenience of illustration, I have described a sheet that produces a cover that can be conveniently perceived to resemble a rectangular box. The cover need not be perceived as rectangular in shape, and it is not necessary to provide fold lines or creases, provided that the regions described or their equivalents are provided.

An end 4 of a vent tube 3 is joined and sealed to the cover 2 by moulding or other suitable means.

Figure 2:
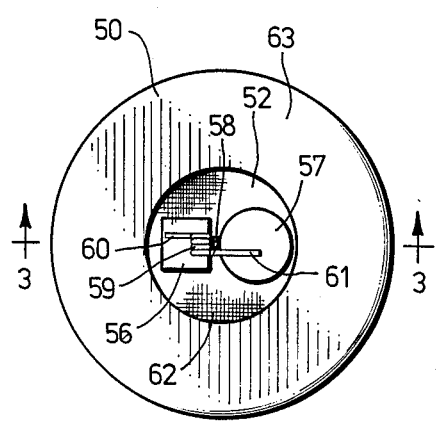
FIG. 2 is an end view of the vent end of the vent tube of the present invention.
Figure 3:
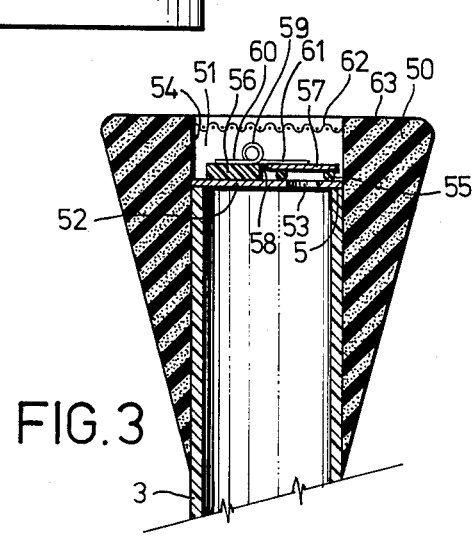
FIG. 3 is a cross-sectional view of the vent end of the vent tube taken along lines 3—3 of FIG. 2.

As shown in FIGS. 2 and 3, a tappered float 50 having a cylindrical opening 51 therethrough is inserted over and sealed to a vent end 5 of the vent tube 3. A rigid baffle support ring 52 having an opening 53 therethrough is joined and sealed to the inside surface 54 of the opening 51 in the tappered float 50. A flat O-ring 55 or other suitable seal is joined and sealed to the support ring 52 around the opening 53. A spring platform 56 is fixed to the support ring 52, and a baffle plate 57 adapted to seal the support ring opening 53 is attached by pivot means 58 to the platform 56. One end 60 of a coil spring 59 is fixed to the spring platform 56 and the other end 61 thereof is fixed the baffle 57, and the spring 59 is adapted to urge the baffle down over the opening 53, thereby sealing the vent end 5 of the vent tube 3.

The vent tube 3 is made light and flexible in construction, and opens at one end 4 into the cover 2. The vent end 5 of the tube 3 is adapted to float on the surface of flood waters, being buoyed up by the float 50 attached thereto. The float is tappered in form and is free of recesses and protrusions that might become entangled with objects and debris outside the cover 2. As flood waters rise, the cover 2 will tend to collapse over the surface of a motor vehicle, and air pressure within the sealed cover 2 and tube 3 and against the baffle 57 will tend to increase. The spring 59 is adapted to yield under the increased pressure exerted against the baffle 57 and to allow the baffle 57 to pivot on the spring platform 56 to release air trapped within the cover 2 and tube 3. When air pressure within the cover 2 and tube 3 has been reduced the spring 59 reseals the opening 53 by urging the baffle 57 to seat against the O-ring or other suitable seal.

A plurality of bumpers are provided to reduce the risk of damage to fixtures extending from a motor vehicle body such, for example, as rear view mirrors and hood ornaments. The said bumpers are made from soft, resilient materials such as foam rubber and are adapted to fit over or wrap around the said fixtures.

Having thus described my invention, what I now claim is:

1. A flood protection apparatus comprising a flexible cover adapted to be wrapped around a motor vehicle and sealed to form a water impervious container and a flexible vent tube having a first and a second end wherein the said first end is attached to and sealed to the said cover and wherein the said vent tube is adapted to open into the space within the said sealed container and wherein the said second end of the said vent tube has provided attached thereto flotation means adapted to buoy up the said second end of the said vent tube to the surface of flood waters and wherein the said second end of the said vent tube has provided therein a closable opening adapted to vent air inside the said sealed container to the atmosphere, and means for closing the said closable opening.

2. A flood protection apparatus comprising a flexible cover adapted to be wrapped around a motor vehicle and sealed to form a water impervious container comprising a sheet of water impervious material having a bottom region not less in length than the length of a motor vehicle and not less in width than the width of a motor vehicle, and having extending outward on opposite sides of the said bottom region side regions not less in length than the length of a motor vehicle and not less in width than the height of a motor vehicle, and having extending outward from a first of the said side regions a first top region not less in length than the length of a motor vehicle, and having extending outward from a second of the side regions a second top region not less in length than the length of a motor vehicle and not less in width than the width of a motor vehicle less the width of the said first top region, and having extending outward from the said second top region an overlap region not less in length than the length of a motor vehicle said overlap region being adapted to overlap the said first top region and being adapted by suitable sealing means to be sealed to the said first top region and wherein the said bottom region is provided with like end regions extending outward from opposite ends thereof, each of the said end regions being not less in width than the width of a motor vehicle and not less in length than the height of a motor vehicle and wherein each of the said end regions has extending from the end thereof a top overlap region not less in width than the width of a motor vehicle, each of the said over lap regions being adapted to overlap the aforesaid top regions and being adapted by suitable sealing means to be sealed to the said top regions and wherein each of the said end regions has extending outward on opposite sides thereof side overlap regions not less in length than the height of a motor vehicle, each of the said side over lap regions being adapted to overlap the aforesaid side regions and being adapted by suitable sealing means to be sealed to the said side regions; and a flexible vent tube having a first and a second end wherein the said first end is attached to and sealed to the said cover and wherein the said vent tube is adapted to open into the space within the said sealed container and wherein the said second end of the said vent tube has provided therearound and attached thereto a recess-free and projection-free tappered float having a lengthwise opening therethrough, said float being adapted to buoy up the said second end of the said vent tube to the surface of flood waters and wherein the said second end of the said vent tube has provided therein a baffle support ring joined and sealed to the inside surface of the said second end of the said vent tube, said support ring having a sealable opening provided therethrough and having provided fixed thereon a spring platform and the said support ring having fixed thereon and surrounding the said opening therethrough a seal adapted to cooperate with a baffle to seal the said opening, and spring means attached at one end to the said spring platform and attached at the other end to a baffle, the said spring means being adapted to urge the said baffle into contact with the said seal means, the said spring means, seal means and baffle being adapted to cooperate to close the said opening throught the said support ring and wherein the said spring means and baffle are adapted to vent air within the said container to the atmosphere and are adapted to prevent the entrance of water, mud or debris into the said vent tube.

* * * * *